US010853781B2

(12) United States Patent
Giacaman

(10) Patent No.: US 10,853,781 B2
(45) Date of Patent: *Dec. 1, 2020

(54) MULTI-DEVICE CONTROL AND DATA COMMUNICATION SYSTEM FOR FUEL DISPENSING EQUIPMENT

(76) Inventor: Miguel S. Giacaman, San Francisco, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 10/515,776

(22) PCT Filed: May 28, 2003

(86) PCT No.: PCT/US03/16679
§ 371 (c)(1),
(2), (4) Date: Nov. 24, 2004

(87) PCT Pub. No.: WO03/099705
PCT Pub. Date: Dec. 4, 2003

(65) Prior Publication Data
US 2005/0240541 A1 Oct. 27, 2005

Related U.S. Application Data

(60) Provisional application No. 60/319,271, filed on May 28, 2002.

(51) Int. Cl.
G07F 13/00 (2006.01)
G06Q 20/20 (2012.01)
G06Q 50/06 (2012.01)
G07F 13/06 (2006.01)
G07F 13/02 (2006.01)
B67D 7/08 (2010.01)
(Continued)

(52) U.S. Cl.
CPC ............... *G06Q 20/20* (2013.01); *B67D 7/08* (2013.01); *G06Q 20/202* (2013.01); *G06Q 50/06* (2013.01); *G07F 5/18* (2013.01); *G07F 11/002* (2013.01); *G07F 13/025* (2013.01); *G07F 13/06* (2013.01); *G07F 15/00* (2013.01)

(58) Field of Classification Search
CPC ............................ G07F 13/025; G07F 11/002
See application file for complete search history.

(56) References Cited

U.S. PATENT DOCUMENTS 4,247,899 A 1/1981 Schiller et al.
5,557,529 A 9/1996 Warn et al.
(Continued)

FOREIGN PATENT DOCUMENTS

EP 1 143 388 10/2001
WO WO 02 09061 1/2002

Primary Examiner — Timothy R Waggoner
(74) Attorney, Agent, or Firm — Frank Pham; Pham IP Group

(57) ABSTRACT

A Local Controller device installed in or on the fuel pump capable of functioning as a pump controller dedicated solely to the pump in which it is installed and as a data router to and from the peripheral devices. This dedicated Local Controller device contains a microcomputer with a pump communications interface and optionally a remote, Site Controller communication interface which is non-dedicated and has control over many pumps at the station. If connected to such a Site Controller, the device will function as a slave to this Site Controller. Otherwise it functions autonomously to control the pump on its own.

21 Claims, 3 Drawing Sheets

(51) Int. Cl.
*G07F 5/18* (2006.01)
*G07F 15/00* (2006.01)
*G07F 11/00* (2006.01)

(56) References Cited

U.S. PATENT DOCUMENTS

| | | | |
|---|---|---|---|
| 5,889,676 A | 3/1999 | Kubo et al. | |
| 6,176,421 B1* | 1/2001 | Royal, Jr. | B67D 7/222 |
| | | | 235/381 |
| 6,275,746 B1* | 8/2001 | Leatherman | G06Q 30/0601 |
| | | | 700/234 |
| 6,351,689 B1* | 2/2002 | Carr | G07F 5/18 |
| | | | 700/236 |
| 6,546,314 B1* | 4/2003 | Carr | B67D 7/222 |
| | | | 700/236 |
| 6,801,835 B2* | 10/2004 | Covington | B67D 7/14 |
| | | | 700/241 |
| 8,666,542 B2* | 3/2014 | Durham | F02D 41/26 |
| | | | 700/236 |
| 2004/0204999 A1* | 10/2004 | Negley, III | G06Q 20/202 |
| | | | 705/16 |

* cited by examiner

MULTI-DEVICE CONTROL AND DATA COMMUNICATION SYSTEM FOR FUEL DISPENSING EQUIPMENT

BACKGROUND OF INVENTION

The present invention relates to a data communication system with electronic devices inside fuel pumps so that new devices can be added easily with minimal installation creating a self-sufficient master/slave dedicated pump controller and data router at the pump.

At present pump control at gas stations is done with a site controller system that interfaces one or more Point of Sale terminals (POS's) to one or more pumps, typically one POS and 8 to 16 pumps. This architecture possesses several drawbacks:

If the POS or site controller fails, becomes busy or overloaded or experience communication problems, then all the pumps connected to said controller are unable to deliver fuel since they depend upon communication and control from these units usually by means of polling for status, authorization to fuel and sales data retrieval commands.

The communication between the controller and the pumps is by means of an electrical interface and command interface which are brand or model specific, and a wiring to form the communication line which is usually brand or model specific too. This results in the need to have a brand or model specific controller making the use of mixed pump brands or models in a single gas station impractical due to the need of independent control systems.

Since all the pump communications are funneled through these single points, only one pump can be addressed at a time creating a communications bottleneck.

The communication between the POS (point of sale) and peripheral devices located at the pump, like credit cards readers, receipt printers, keypads and displays is achieved by an electrical interface, wiring and/or command interface in addition to the wiring and communication network for controlling the pumps.

Most fuel station systems that are installed in regular gas stations or industrial fuel stations throughout the world use a current loop system for transferring data between a control console and the various fuel pumps. The data transferred is related with fuel consumption, type of fuel, pump number (or pump ID) and set up e.g., price per volume unit. The current loop approach can support multiple pumps, but it is not a suitable system to support additional electronic devices that can be added to the pump head. Examples of such devices are credit card readers, radio tag readers, or any additional electronics that requires data transfer between the pump and the control console. The providers of these additional devices struggle with costly installation and retrograding, and with explosion hazards.

A typical solution involves the installation of cabling to connect the additional pump head devices with the control console. This requires underground and in-pump wiring that meets safety (explosion prevention) codes at considerable expense. The new system typically coexists with the existing current loop system, and does not allow for the addition of new devices. Future extension of the system, or addition of devices, may impose yet a third wiring system.

In the art, communication with a pump is performed by means of protocol that is specific for that brand and/or model. There are several brand-specific protocols and at least one non-brand-specific protocol—the IFSF—currently in use. But the pump has to be compatible with this protocol or a translation module has to be installed associated with the pump, usually inside. So, the IFSF has effectively become one more pump-dependent protocol.

In other words, even protocols which are non-brand-specific like the IFSF are model-specific. For example, Wayne Corp. makes the same pump hardware model with Wayne current loop protocol, with IFSF and DART. But they all are fixed protocols associated with a particular brand and/or model.

Thus, the site controllers in the prior art are usually protocol specific. Some units support more than one controller interface module in the same enclosure, e.g. one controller interface module for up to 8 Gilbarco pumps and a second controller interface module for up to 8 Wayne pumps. Or, one controller interface module for up to 8 Gilbarco pumps and a second controller interface module for up to 8 IFSF pumps.

One of the most important limitations is that each control module must use a completely independent circuit of data lines. Another limitation is that multiple controllers and multiple networks are needed for multiple pumps models or brands. If in a gas station are installed, for example, one Gilbarco pump, one Wayne with current loop and two Wayne IFSF, it would be needed one controller for 8 Gilbarco, one controller for 8 Wayne current loop and one controller for 8 IFSF. This in addition to 3 independent networks. If two pumps swap their positions, e.g., Gilbarco and Wayne DART or if one pump in replaced by a different brand or model, e.g., Gilbarco by Tokheim, it would be necessary to break through the pavement and rewire the networks connecting the pumps to the pump station site controller. One solution is to install a brand protocol translation module e.g. Gilbarco to Wayne DART, so a pump can change its native protocol for another brand's or mode's native protocol. It would be desirable to achieve a more universal solution to these problems.

It is therefore desirable to provide multi-service capability for the existing data communication systems, allowing the easy addition of additional multiple control electronics or devices on the pump heads and channels the data communication through the existing data communication system.

Also, it is desirable to provide a practical and cost effective solution for mixing brands in the same gas station, improve the reliability and performance of the control system.

SUMMARY OF INVENTION

A Local Controller device installed in or on the fuel pump capable of functioning as a pump controller dedicated solely to the pump in which it is installed and as a data router to and from the peripheral devices. This dedicated Local Controller device contains a microcomputer with a pump communications interface and optionally a remote, Site Controller communication interface which is non-dedicated and has control over many pumps at the station. If connected to such a Site Controller, the device will function as a slave to this Site Controller. Otherwise it functions autonomously to control the pump on its own.

BRIEF DESCRIPTION OF DRAWINGS

The above-mentioned and other features and objects of this invention and the manner of attaining them will become more apparent and the invention itself will be better understood by reference to the following description of an embodiment of the invention, taken in conjunction with the accompanying drawings wherein.

DETAILED DESCRIPTION

Figure 1:
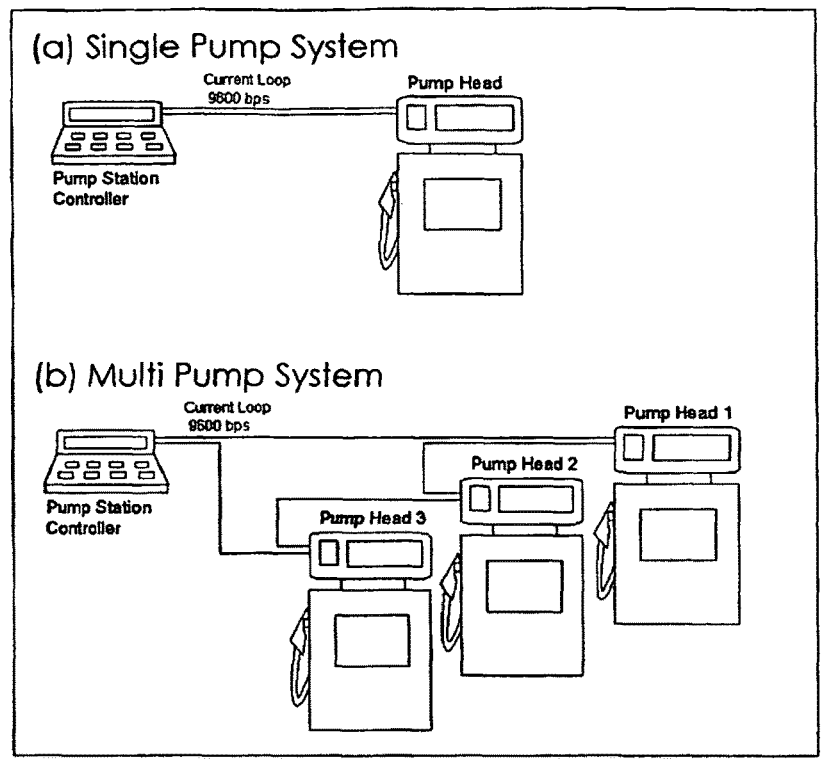
FIG. 1 shows a typical current loop system with its Control Console (shown as a Site Controller in the case of fueling station) and a set of Remote Devices (shown as the pump heads in the case of a fueling station).

A dedicated local controller installed, one per fuel pump, proximate and in connection with each said fuel pump, is capable of functioning as a pump controller dedicated solely to the pump for which it is installed. This dedicated pump controller contains a microcomputer with a (brand-specific) pump communications interface and optionally a communications interface with a conventional (remote or external) main pump controller, which is non-dedicated and has control over one or more pumps at the gas station. If connected to such a main pump controller, the device may function as a slave to this main pump controller. Otherwise it may function autonomously to control the fuel pump on its own.

As used herein, a "fuel pump" is to be understood as a device useful for introducing liquid fuel into vehicles (e.g., car and truck) fuel tanks. This fuel pump must be able to measure at least the volume or amount dispensed. Preferably, it also displays the volume, price per unit and total cost. It should also have a capacity to transfer this data to an internal or external device capable of issuing a receipt and/or recording the transaction. It may be a single or dual unit, e.g. able to execute one or two fueling operations simultaneously with independent metering. Most fuel pumps in use are dual (two-sided) units with which vehicle drivers are very familiar.

As used herein, "Point of Sale terminals" (POS's) are understood to mean computer units intended to handle the sales records and databases used to price and authorize a sale.

As used herein, "electrical interface" refers to the electrical circuitry needed to send and receive data over a communication line. Two or more communication lines could be very different (e.g. RS-485 and Current Loop) or be similar but with different parameter definitions (e.g. Current loops with 20, 30 or 45 mA), with current generated by the controller or by the fuel pump.

As used herein, a "site controller" refers to an electronic device or interface connected to one or more (usually 8 to 16) fuel pumps and to one or Points of Sale (POS). Its main task is to manage the communications between the POS and one or more fuel pumps. Sometimes this interface is included as part of the POS itself.

As used herein, "dedicated" is understood to mean that each dedicated pump controller is exclusively dedicated to a single (single or dual-sided) fuel pump.

As used herein, "proximate" and "in connection with" are understood to mean that the "proximate" pump controller is located either inside the fuel pump, or is directly upon or next to the pump, and to exclude the situation where the pump controller is, for example, located inside the building structure at the gas station and connected to the pump via some form of under-pavement wiring.

The dedicated local controller may also have a general purpose auxiliary communication port referred to herein as a "MultiPort interface" which is used to communicate either directly or with other devices (or its independent controllers) at the pump such as receipt printers, credit card reader, keypads, displays.

Figure 4:
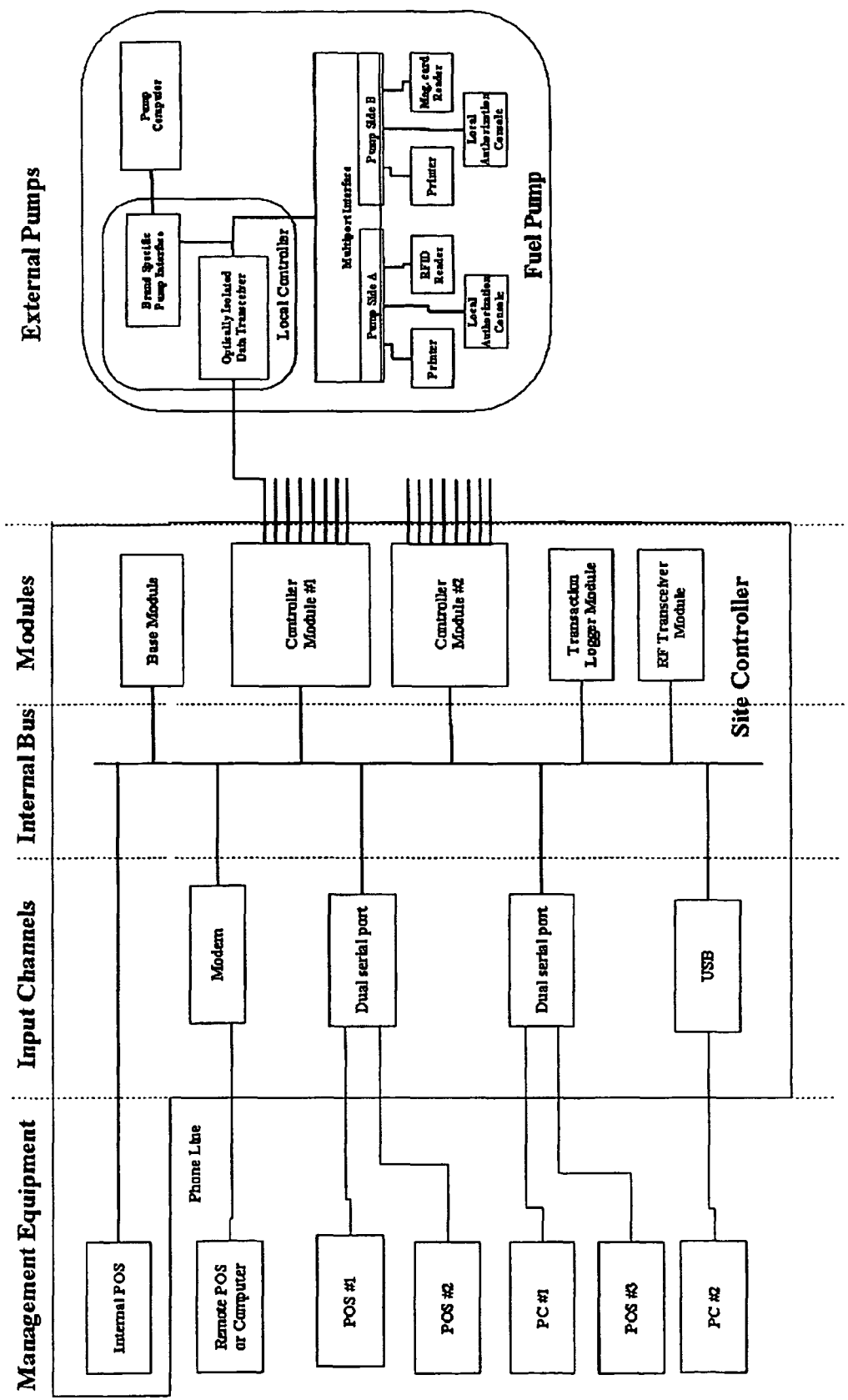
FIG. 4 is a detailed block diagram showing in detail, the management equipment, input channel, internal bus, and other modules, as connected to external pumps.

This communication feature may be used to transfer data FROM and TO the Site Controller, Point of Sale (POS) or Console (usually for self-service operator) through the Local Controller device itself, acting as a data router between the peripheral devices and the Site Controller, Console or one or more POS's. These may be connected on site or remotely, see FIG. 4, e.g., over the Internet, or a suitable intranet.

Another major benefit of this control device is that it can have a brand specific electrical interface for the pump side and a different one for the Site Controller side acting as an electrical interface translator. The "electrical interface" refers to the hardware "plug-in" connections, and may include an interface comprising optical elements as well. If more than one or ideally all the devices have the same interface on the Site Controller side and a pump brand specific interface on the pump side then mixed pump brand can be connected to the same Site Controller through this at the pump dedicated Local Controller device.

This electrical interface on the site controller side can connect the Local Controller device to the Site Controller or directly to the POS without intervention of a Site Controller. This means that the POS may communicate with the Local Controllers (and through it to the peripheral devices) directly or through a Site Controller. Making the use of a Site Controller optional.

The Site Controller or POS's may include a Console to manage the station or self service operator attended system.

Since the protocol for commands and data transfer TO and FROM the pumps is also brand or model specific (different for each brand or model of pump) a brand to brand protocol command translation can be implemented. Note, it is often the practice for said data transfer to be embedded in commands. Commands usually comprise binary data sent to and from a pump in order to allow a specific task (e.g., change the price per volume unit, open the fuel valves in order to allow the flow of fuel when the customer presses the nozzle lever to begin filling the tank).

This command translation can have a pump brand- (or model-)specific on the pump side and a Site Controller or POS-specific on the controller or POS side.

If the Site Controller or POS side process commands which are used in more than one (and ideally all) the Local Controllers then a pump-independent "Common Command Protocol" could be translated to and from pump brand specific commands. Then the dedicated Local Controller devices would become electrical interface and protocol translators, allowing the connection of different pump brands in a single gas station to a single unique control system.

In other words, the site controller uses a protocol that is not associated with any native protocol and that does not have to be standard. That is, it can be customized for a particular installation, and every installation can employ a different "customized protocol." This is what is meant by a Pump-independent "Common Command Protocol." The only requirements for this are as follows: 1) the main non-brand-or-model-specific controller and all the dedicated pump controllers connected to that main controller (sharing the same communications line) must use, i) an electrical interface compatible with the communications line, and ii) a compatible addressing mode, so once a dedicated pump controller has been addressed by the main pump controller they can talk in their own protocol or a common one (common for a particular installation), and 2) the dedicated pump controllers have a matching electrical interface (pump side electrical interface) with the pump in which they are installed, e.g. Gilbarco, Wayne DART, Tokheim, Wayne IFSF, etc.

If the above minimum requirements are met then another communication option becomes available. Since the site controller and the local dedicated controllers are able to communicate over the same communications line and the site controller is able to address a local device, once the latter is accomplished then the site controller could send the command's binary data according to the "pump's native protocol". This would mean that if a multibrand feature is pursued the site controller is able to merely "talk" in the different "native protocols" matching the brands or model in which the local device is connected to. In the prior art if a site controller could handle the protocols for more than one brand or model it would still not be able to establish communication with more than one brand due to the use of different electrical interfaces or communications parameters, e.g. current level on the loop and/or baud rate. Also, if a particular brand receives a command for another brand or model it is most likely to enter into an error condition.

Another benefit of the present invention is the improvement of the data capacity of the communication line and/or the processing time at the site controller. Usually the fuel pumps do not answer the site controller immediately following a data request because is most likely the pump's computer be busy on a highest priority task. This usually translates in a waiting time for the site controller, and due to the sequential nature of the communications network significant delay may occur if several pumps are fueling simultaneously.

With the invention disclosed herein, the local dedicated device is routinely requesting data to the pump that is most like to be requested by the site controller (e.g. status request), having the data ready to be passed quickly to the site controller. Also, the answer may be sent to the site controller in a format that is more "compact or compressed" the in the pump's native protocol, increasing so the data capacity of the communication line originally installed for communication between the site controller directly the pumps using their native electric interface. That is, several native commands can be packed into a single command of the pump-independent common command protocol.

Also, some brands like Wayne need the data to be "processed" in a time consuming manner causing delays which may be cumulative. With the current invention the local dedicated device can have the data processed prior to the site controller's data request and answer quickly to the site controller rather than waiting until a request arrives from the site controller to begin processing.

Another benefit use of the local device processing capacity is the possibility to execute a sequence of commands independently of the site controller and once the sequence is terminated pass the results to the site controller. An example would be:—change the price per volume unit—authorize fueling— . . . once the fueling is done . . . —restore original price per volume unit. To add security to the above, the local dedicated controller can abort the fueling authorization or block the pump if any relevant step in the sequence is not accomplished.

For multi brand compatibility; the fuel pump interfaces can be self-configurable, that is, the dedicated pump controller detects the brand or model of the pump and automatically configures the interface to accommodate the fuel pump brand or model, similarly to how many computers detect their peripherals and establish a suitable interface.

Figure 2:
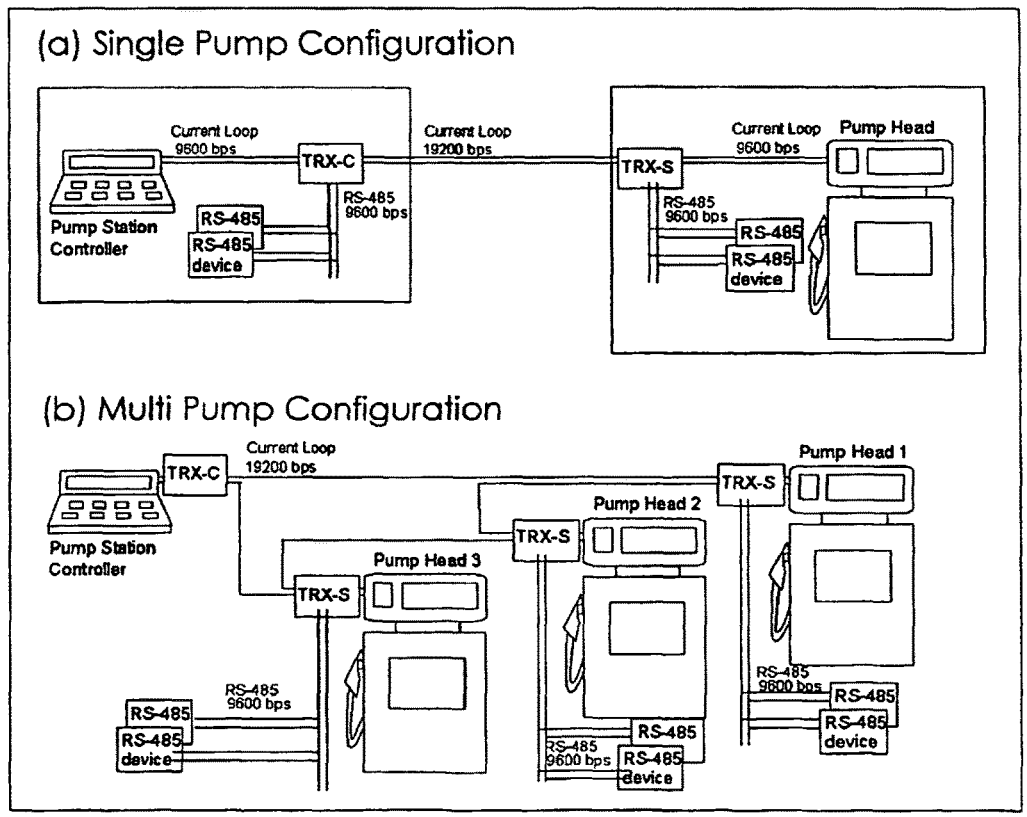
FIG. 2 shows how the MultiData-Loop can be applied to the case of a gas station.
Figure 3:
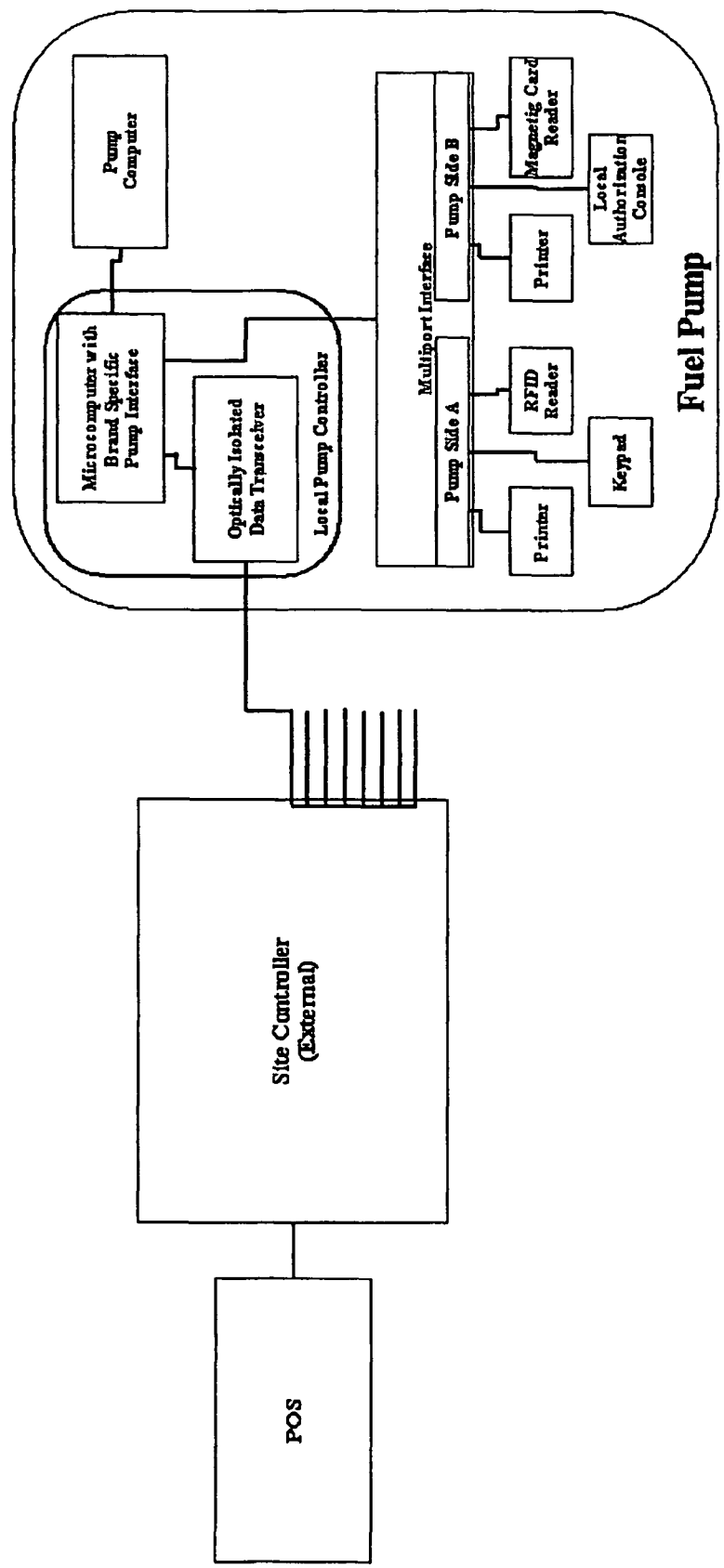
FIG. 3 is the circuit associated with the Local Controller device and its connection with the MultiPort feature. The multiplexing of the Pump data and the Peripheral devices data into a single current-loop and subsequent de-multiplexing of the signal by the Local Controller or MultiPort interface or feature is shown. The optional electrical isolation circuits are also shown.

An enhancement or variation of the current-loop (or other pump control interfaces such as but not limited to wireless channels, the use of an AC power line for data transmission, etc.) data communication between fuel pumps and a Site Controller allows to add multiple devices in each pump head and use the existing current-loop as the data channel so that new wiring does not need to be added and/or old wiring removed. This multi-device enhancement of the current-loop can also be used for non-fuel pump applications, such as security systems. The system comprises a Control Module that connects to the Site Controller and provides an additional Data Port input/output. Referring to FIG. 2, the Control Module and the Data Port signals multiplexed and demultiplexed using a transmit/receive control module (TRX-C) device communicating with or built directly into the site controller wherein they are both channeled through the existing current loop wiring. A transmit/receive service module (TRX-S) is placed on the other end (the pump end) of the current loop to decode the signal into the current-loop component and the Data Port component. The current loop functionality is preserved, while the multi-device support functionality of the Data Port is added to the system with no requirement for additional explosion proof cabling.

FIG. 1 shows the current loop system currently in used in most service and fueling stations worldwide. In a generic way, the system in FIG. 1 consists of a Control Console (shown as a pump station controller in the case of fueling station) and a set of Remote Devices (shown as the pump heads in the case of a fueling station). Each Remote Device (pump) uses specific Service Electronics or Service Devices to provide, for example, fuel consumption, pump status, pump number, and/or other data.

While the invention has been described as having a specific embodiment, it will be understood that it is capable of further modifications which are equivalent thereto. This application is therefore intended to cover any variations, uses or adaptations of the invention following the general principles thereof and including such departures from the present disclosure as come within known or customary practice in the art to which this invention pertains.

I claim:

1. A dedicated pump controller apparatus for installation dedicated and proximate a single fuel pump for controlling said single fuel pump comprising:
   at least one processor, wherein said processor enables said dedicated pump controller to function as master mode for controlling dispensing operations of said fuel pump independently of a main pump controller when said data communication interface is inactive, and wherein said processor enables said dedicated pump controller to function as slave mode for controlling dispensing operations of said fuel pump dependently of a main pump controller when said data communication interface is active;
   at least one fuel pump electrical interface f communicating electrically with said fuel pump;
   at least one main pump controller electrical interface communicating with a main pump controller via at least one existing data communication channel carrying data associated with said fuel pump and data associated with said at least one peripheral device, wherein said at least one existing data communication channel is selected from the group consisting of current loop and RS-485; and at least one peripheral device communications interface for communicating with at least one peripheral device connected with said fuel pump.

2. The apparatus of claim 1, said fuel pump electrical interface comprising at least one brand- or model-specific fuel pump electrical interface.

3. The apparatus of claim 2, said fuel pump electrical interface comprising configurability communicate with at least two different brand- or model-specific fuel pump electrical interfaces.

4. The apparatus of claim 2, said fuel pump electrical interface further comprising a self configurable interface detecting said brand or model of said fuel pump and automatically configuring to communicate with said fuel pump.

5. The apparatus of claim 2, further comprising:
an electrical interface translator translating between said at least one brand- or model-specific fuel pump electrical interface and said at least one main pump controller electrical interface.

6. The apparatus of claim 5, further comprising:
a command translator translating between commands carried over said at least one brand- or model specific fuel pump electrical interface and commands carried over said al least one main pump controller electrical interface.

7. The apparatus of claim 6, further comprising:
a common command protocol communicating with a plurality of devices connected to a site controller side of said dedicated pump controller; wherein:
said electrical interface translator and said command translator enable connecting a plurality of different brand- or model-specific fuel pumps to a single control system.

8. The apparatus of claim 2, further comprising:
a command translator translating between commands carried over said at least one fuel pump electrical interface and commands carried over said at least one main pump controller electrical interface.

9. The apparatus of claim 1, further comprising:
an electrical interface translator translating between said at least one fuel pump electrical interface and said at least one main pump controller electrical interface.

10. The apparatus of claim 1, said pump controller electrical interface connecting directly to a POS.

11. The apparatus of claim 1, said pump controller electrical interface connecting directly to a site controller.

12. The apparatus of claim 1, further comprising:
a command translator translating between commands carried over said at least one fuel pump electrical interface and commands carried over said at least one main pump controller electrical interface.

13. The apparatus of claim 1, further comprising:
a common command protocol for communicating with a plurality of devices connected to a site controller side of said dedicated pump controller, enabling connecting a plurality of different brand- or model-specific fuel pumps a single control system.

14. A system for communicating with a fuel pump and with peripheral devices associated with said fuel pump, comprising:
at least one existing data communication channel carrying data associated with said fuel pump and data associated with said at least one peripheral device, from and to said fuel pump and said peripheral devices, wherein said at least one existing data communication channel is selected from the group consisting of current loop and RS-485; and at least one processor, wherein said processor enables said dedicated pump controller to function as master mode for controlling dispensing operations of said fuel pump independently of a main pump controller when said data communication interface is inactive, and wherein said processor enables said dedicated pump controller to function as slave mode for controlling dispensing operations of said fuel pump dependently of a main pump controller when said data communication interface is active.

15. The system of claim 14, further comprising:
a transmit-receive service module proximate said fuel pump transmitting and receiving said data associated with said fuel pump between said at least one existing data communication channel and said fuel pump, and transmitting and receiving said data associated with said peripheral devices between said single data channel and said peripheral devices.

16. The system of claim 15, further comprising a dedicated pump controller apparatus installed dedicated to and proximate a single fuel pump, said dedicated pump controller comprising:
at least one processor;
at least one fuel pump electrical interface for communicating electrically with said fuel pump;
at least one main pump controller electrical interface different from said fuel pump electrical interface, for communicating electrically with a main pump controller;
at least one peripheral device communications interface for communicating with at least one peripheral device connected with said fuel pump; and said transmit-receive service module.

17. The system of claim 15, further comprising:
a transmit-receive control module transmitting and receiving both said data associated with said fuel pump and said data associated with said peripheral devices between a site controller and said single data channel.

18. The system of claim 17, said site controller comprising a data connection between said site controller and a remotely-located POS.

19. The system of claim 18, said data connection comprising an internet connection for transmitting data between said site controller and a POS.

20. The system of claim 18, said data connection comprising an intranet connection for transmitting data between said site controller and a POS.

21. The method of claim 18, further comprising:
connecting a plurality of different brand- or model-specific fuel pumps to a single control system, using a common command protocol for communicating with a plurality of devices connected to a site controller side of said dedicated pump controller.

* * * * *